United States Patent
Lee et al.

(10) Patent No.: US 8,914,448 B2
(45) Date of Patent: Dec. 16, 2014

(54) MOBILE COMMUNICATION SYSTEM AND METHOD FOR THE REQUESTING OF POSITIVE DELIVERY REPORTS FROM INDIVIDUAL GROUP MEMBERS

(75) Inventors: Seung-Yong Lee, Seoul (KR); Kyung-Tak Lee, Yongin-si (KR); Wuk Kim, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 167 days.

(21) Appl. No.: 13/123,116

(22) PCT Filed: Oct. 7, 2009

(86) PCT No.: PCT/KR2009/005731
§ 371 (c)(1),
(2), (4) Date: Jul. 5, 2011

(87) PCT Pub. No.: WO2010/041869
PCT Pub. Date: Apr. 15, 2010

(65) Prior Publication Data
US 2011/0252105 A1    Oct. 13, 2011

(30) Foreign Application Priority Data

Oct. 7, 2008   (KR) .................. 10-2008-0098179

(51) Int. Cl.
*G06F 15/16* (2006.01)
*H04L 12/58* (2006.01)

(52) U.S. Cl.
CPC ........... *H04L 12/581* (2013.01); *H04L 12/5875* (2013.01); *H04L 51/34* (2013.01); *H04L 12/5885* (2013.01); *H04L 51/04* (2013.01)
USPC .......................................... 709/206; 709/219

(58) Field of Classification Search
CPC ... H04L 12/581; H04L 51/04; H04L 12/1863; H04L 12/2623; G06F 15/16
See application file for complete search history.

(56) References Cited

U.S. PATENT DOCUMENTS

| 7,269,655 B2 | 9/2007 | Kim | |
|---|---|---|---|
| 8,275,838 B2 * | 9/2012 | Keohane et al. | 709/206 |
| 2004/0254992 A1 * | 12/2004 | Kiss et al. | 709/206 |

FOREIGN PATENT DOCUMENTS

| KR | 1020040073888 | 8/2004 | |
|---|---|---|---|
| WO | WO 2008065253 A1 * | 6/2008 | H04L 12/58 |

OTHER PUBLICATIONS

E. Burger et al. Instant Message Disposition Notification Draft-02, Nov. 7, 2006.*

(Continued)

*Primary Examiner* — Joshua Joo
*Assistant Examiner* — Younes Naji
(74) *Attorney, Agent, or Firm* — The Farrell Law Firm, P.C.

(57) ABSTRACT

A method and system are provided for requesting a disposition notification from each group member for an Instant Messaging (IM) message. A sender requests desired group members for a disposition notification for an IM message in a group messaging service. The sender on the transmission side constructs an IM message to include information on the group members designated by the sender and transmits the constructed IM message to an IM server. After receiving the IM message from the sender, the IM server generates IM messages corresponding to the group members based on the information included in the received IM message, and then transmits the generated IM messages to respective group members. Accordingly, only the group members that have received the IM messages can generate their own reports, and then transmit the generated reports to the sender, allowing the sender to receive the disposition notification only from desired group members.

11 Claims, 5 Drawing Sheets

```
From: Alice <im:alice@example.com>
To: Bob <im:bob@example.com>
To: Ann <im:ann@example.com>
To: Tom <im:tom@example.com>
NS: imdn <urn:ietf:params:imdn>
Imdn.Message-ID: 34jk324j
DateTime: 2006-04- 04T12:16:49-05:00
                                                300
imdn.Disposition-Notification: read; target=<im:bob@example.com>, <im:ann@example.com>,
                              positive-delivery; target=<im:ann@example.com>
Content-type: text/plain
Content-length: 12

Hello World
```

(56) References Cited

OTHER PUBLICATIONS

Burger—"Instant Message Disposition Notification" Nov. 27, 2006.*

PCT/ISA/237 Written Opinion issued on PCT/KR2009/005731 (3 pp.).

PCT/ISA/210 Search Report issued on PCT/KR2009/005731 (3 pp.).

Burger, et al., Instant Message Disposition Notification, draft-ietf-simple-imdn-02, Nov. 27, 2006 (34 pp.).

Burger, et al., Instant Message Disposition Notification, draft-ietf-simple-imdn-07, Apr. 2, 2008 (37 pp.).

Agarwal, et al., Sure-Mail: Notification Overlay for Email Reliability, In: ACM HotNets-IV Workshop, Nov. 14, 2005 (6 pp.).

Zhang, et al., Inter-working between SIMPLE and IMPS, ScienceDirect, Computer Standards and Interfaces 39 (2007) 584-600 (17 pp.).

Shah, et al. An Empirical Examination of Open Standards Development, 41st Hawaii International Conference on System Sciences—2008 (10 pp.).

\* cited by examiner

Disposition-Notification = "Disposition-Notification" ":" [ (notify-req * (COMMA notify-req) ) ]
notify-req = ( "negative-delivery" / "positive-delivery" / "processing" /
               "read" / Token) * (SEMI disp-notif-params)
disp-notif-params = generic-param

200 target = "target" "=" ( "<" URI ">" ) * ( COMMA ("<" URI ">" ) )

FIG.1

```
From: Alice <im:alice@example.com>
To: Bob <im:bob@example.com>
To: Ann <im:ann@example.com>
To: Tom <im:tom@example.com>
NS: imdn <urn:ietf:params:imdn>
Imdn.Message-ID: 34jk324j
DateTime: 2006-04- 04T12:16:49-05:00                              300
┌─────────────────────────────────────────────────────────────────┐
│ imdn.Disposition-Notification: read; target=<im:bob@example.com>, <im:ann@example.com>, │
│                    positive-delivery; target=<im:ann@example.com>                       │
└─────────────────────────────────────────────────────────────────┘
Content-type: text/plain
Content-length: 12

Hello World
```

FIG.3

```
From: Alice <im:alice@example.com>
To: Bob <im:bob@example.com>
To: Ann <im:ann@example.com>
To: Tom <im:tom@example.com>
NS: imdn <urn:ietf:params:imdn>
Imdn.Message-ID: 34jk324j                                    405              400
DateTime: 2006-04-04T12:16:49-05:00
┌─────────────────────────────────────────────────────────────────────────┐
│ imdn.Disposition-Notification: read; target=<cn35t8jf02@example.com>,   │
│                      positive-delivery; target=<im:ann@example.com>     │
└─────────────────────────────────────────────────────────────────────────┘
Content-type: multipart/mixed; boundary="content-boundary"
Content-length: 374

--content-boundary
Content-type: text/plain
Content-length: 12

Hello World                                                       410
--content-boundary
┌─────────────────────────────────────────────────────────────────────────┐
│ Content-type: application/resource-lists+xml                            │
│ Content-Length: 362                                                     │
│ Content-ID: <cn35t8jf02@example.com>  ~415                              │
│                                                                         │
│ <?xml version="1.0" encoding="UTF-8" ?>                                 │
│ <resource-lists xmlns="urn:ietf:params:xml:ns:resource-lists"           │
│         xmlns:xsi="http://www.w3.org/XMLSchema-instance">               │
│    <list>                                                               │
│       <entry uri="im:ann@example.com" />                                │
│       <entry uri="im:bob@example.com" />                                │
│    </list>                                                              │
│ </resource-lists>                                                       │
└─────────────────────────────────────────────────────────────────────────┘
--content-boundary--
```

MOBILE COMMUNICATION SYSTEM AND METHOD FOR THE REQUESTING OF POSITIVE DELIVERY REPORTS FROM INDIVIDUAL GROUP MEMBERS

PRIORITY

This application claims priority under 35 U.S.C. §119(a) to Korean Patent Application Serial No. 10-2008-0098179 filed Oct. 7, 2008, and to International Application PCT/KR2009/005731 filed Oct. 7, 2009, the disclosure of each of which is incorporated herein by reference.

BACKGROUND OF THE INVENTION

1. Field of the Invention

The present invention relates to a mobile communication system and a method for providing a messaging service and, more particularly, to a mobile communication system and a method for requesting from group members of a group messaging service a disposition notification of a message status when transmitting the message to the group members.

2. Description of the Related Art

The Open Mobile Alliance (OMA) maintains a standard specification named Instant Messaging based on Session Initiation Protocol for Instant Messaging and Presence Leverage Extensions (SIMPLE IM) service. This instant messaging technology enables groups to transmit/receive messages to/from each other by use of groups defined by each user of an instant message. In this case, a service supported by such instant messaging technology refers to a group messaging service. As described above, the group messaging service is based on the SIMPLE IM service in which multiple users can simultaneously transmit/receive messages to/from each other according to a Session Initiation Protocol (SIP).

In the SIMPLE IM service, after transmitting an IM message, a user on a transmission side often desires to know whether a user on a reception side has actually received the IM message or has read the received IM message. In this case, the user on the transmission side may request a response from the user on the reception side or an IM server on the reception side for Instant Message Disposition Notification (IMDN), which is a processing state of the IM message transmitted from the user on the transmission side. The detailed contents of the IMDN can be checked by reference to Burger, et al., *Instant Messaging Disposition Notification, [draft-ietf-simple-imdn-07]*, Apr. 2, 2008. The IMDN, which the user on the transmission side can request, are largely classified into three types: processing reports, delivery reports, and read reports.

The processing report indicates that the IM message transmitted by the user on the transmission side has been normally processed by the IM sever. This processing report has four attributes. A "processed" attribute indicates that the IM message is normally processed. A "stored" attribute indicates that the IM message is stored in a network for later delivery of the IM message. An "error" attribute indicates that the result of IM message processing cannot be checked. A "forbidden" attribute indicates that the processing report is not allowed.

The delivery report indicates whether the IM message has been delivered to a specified terminal on the reception side. The delivery reports are distinguished by a positive delivery and a negative delivery. This delivery report has four attributes. A "delivered" attribute indicates that the IM message is delivered to the specified terminal on the reception side. A "failed" attribute indicates that the IM message cannot be delivered to the relevant terminal on the reception side. An "error" attribute indicates that it is not possible to check whether the IM message has been delivered to the specified terminal on the reception side. A "forbidden" attribute indicates that the delivery report is not allowed.

The read report indicates whether the user on the reception side has checked or has reproduced the IM message. The read report has three attributes: a "read" attribute indicates that the user on the reception side has checked or has reproduced the IM message; an "error" attribute indicates that it is not possible to know whether the user on the reception side has checked the IM message; and a "forbidden" attribute indicates that the read report is not allowed.

As described above, a network on the reception side or the terminal on the reception side, which has received the IMDN request, may transmit several types of notifications back to a network on the transmission side or the terminal on the transmission side by using the processing report, the delivery report, the read report and so on, depending on the results of IM message processing. Further, a header field, a message format and other details, which are newly defined for expressing the IMDN request and a response to the IMDN request, can be checked in the Burger reference document.

In the group messaging service described above, any user can make requests of the other remaining users for IMDNs when transmitting IM messages to the other remaining users who are participating in the group messaging. However, in a current system, the IM messages transmitted from a sender are delivered to all members, excluding the sender, who are participating in the group messaging. Therefore, if the sender expresses his/her intention for IMDN requests in the IM messages, the other remaining terminals or users that have received the IM messages are requested for the IMDNs. Accordingly, they generate their own reports, and then transmit the generated reports back to the network on the transmission side or the terminal on the transmission side.

However, the method described above is not efficient from the sender's viewpoint, as well as from the networks' viewpoint. When the other remaining users, who have received the IM messages, generate their own reports by the IMDN requests of the sender and then transmit the generated reports to the sender, a large load may be applied to the network, possibly causing network failure. Moreover, when the sender receives the reports from the other remaining recipients even though he/she is interested in only the result of IM message disposition from a particular recipient, the sender may believe that the reports of his/her interest are spam messages.

SUMMARY OF THE INVENTION

The present invention has been made in view of the above-mentioned problems, and the present invention provides a mobile communication system and a method, by which a sender can request group members of a group messaging service for a disposition notification for a message when transmitting the message to the group members.

In accordance with an aspect of the present invention, a method is provided for requesting a disposition notification from each group member for an Instant Messaging (IM) message by a transmission client in a mobile communication system including the transmission client, an IM server and a plurality of target clients, the method including generating an IM message including information designating at least two target clients, from which reports of IM message reception are requested, from among the plurality of target clients are requested, and report types for which each of the at least two target clients are requested; transmitting the generated IM message to the IM server; and receiving reports corresponding to the report types requested from each of the at least two target clients through the IM server.

In accordance with another aspect of the present invention, a method is provided for providing a disposition notification from each group member for an IM message by an IM server in a mobile communication system including a transmission client, the IM server and a plurality of target clients, the method including receiving an IM message from the transmission client; determining whether the received IM message includes information designating at least two target clients, from which reports of the IM message reception from among the plurality of target clients, and report types for which each of the at least two target clients are requested; re-generating an IM message from the received IM message for each of the at least two target clients, and transmitting the re-generated IM message; receiving reports corresponding to the report types requested from each of the at least two target clients from the IM server; and transmitting the received reports to the transmission client.

In accordance with another aspect of the present invention, a transmission client is provided for requesting a disposition notification from each group member for an IM message in a mobile communication system including the transmission client, an IM server and a plurality of target clients, the transmission client including a message generator for generating an IM message including information designating at least two target clients, from which reports of IM message reception from among the plurality of target clients are requested, and report types for which each of the at least two target clients are requested; and a transmitter/receiver for transmitting the generated IM message to the IM server, and receiving reports corresponding to the report types requested from each of the at least two target clients through the IM server.

In accordance with another aspect of the present invention, an IM server is provided for providing a disposition notification from each group member for an IM message in a mobile communication system including a transmission client, the IM server and a plurality of target clients, the IM server including a controller for determining whether an IM message received from the transmission client includes information designating at least two target clients, from which reports of IM message reception from among the plurality of target clients, and report types for which each of the at least two target clients are requested, and re-generating an IM message from the received IM message for each of the at least two target clients; and a transmitter/receiver for receiving the IM message from the transmission client, transmitting the re-generated IM message to each of the at least two target clients, receiving reports corresponding to the report types requested from each of the at least two target clients in response to the transmission of the re-generated IM message, and transmitting the received reports to the transmission client.

According to the present invention, when a sender requests Instant Message Disposition Notification (IMDN) for an IM message transmitted by him/herself, by improving the existing method for requesting all group members excluding the sender for IMDN, the sender can request only desired group members for the IMDN. Therefore, the sender can be prevented from receiving undesired reports. As a result, it is possible to reduce the charging burden caused when the sender and each recipient transmits/receives an unnecessary report to/from each other. Further, by preventing an unnecessary waste of network resources, the network resources can be efficiently utilized, promoting the quality of an IM service.

BRIEF DESCRIPTION OF THE DRAWINGS

The foregoing and other objects, features and advantages of the present invention will become more apparent from the following detailed description when taken in conjunction with the accompanying drawings in which:

FIG. 1 illustrates a syntax in a Disposition-Notification header field according to an embodiment of the present invention;

FIG. 3 illustrates the case of directly expressing target recipients according to an embodiment of the present invention;

FIG. 4 illustrates the case of indirectly expressing target recipients according to an embodiment of the present invention.

DETAILED DESCRIPTION OF THE PREFERRED EMBODIMENTS

Figure 2:
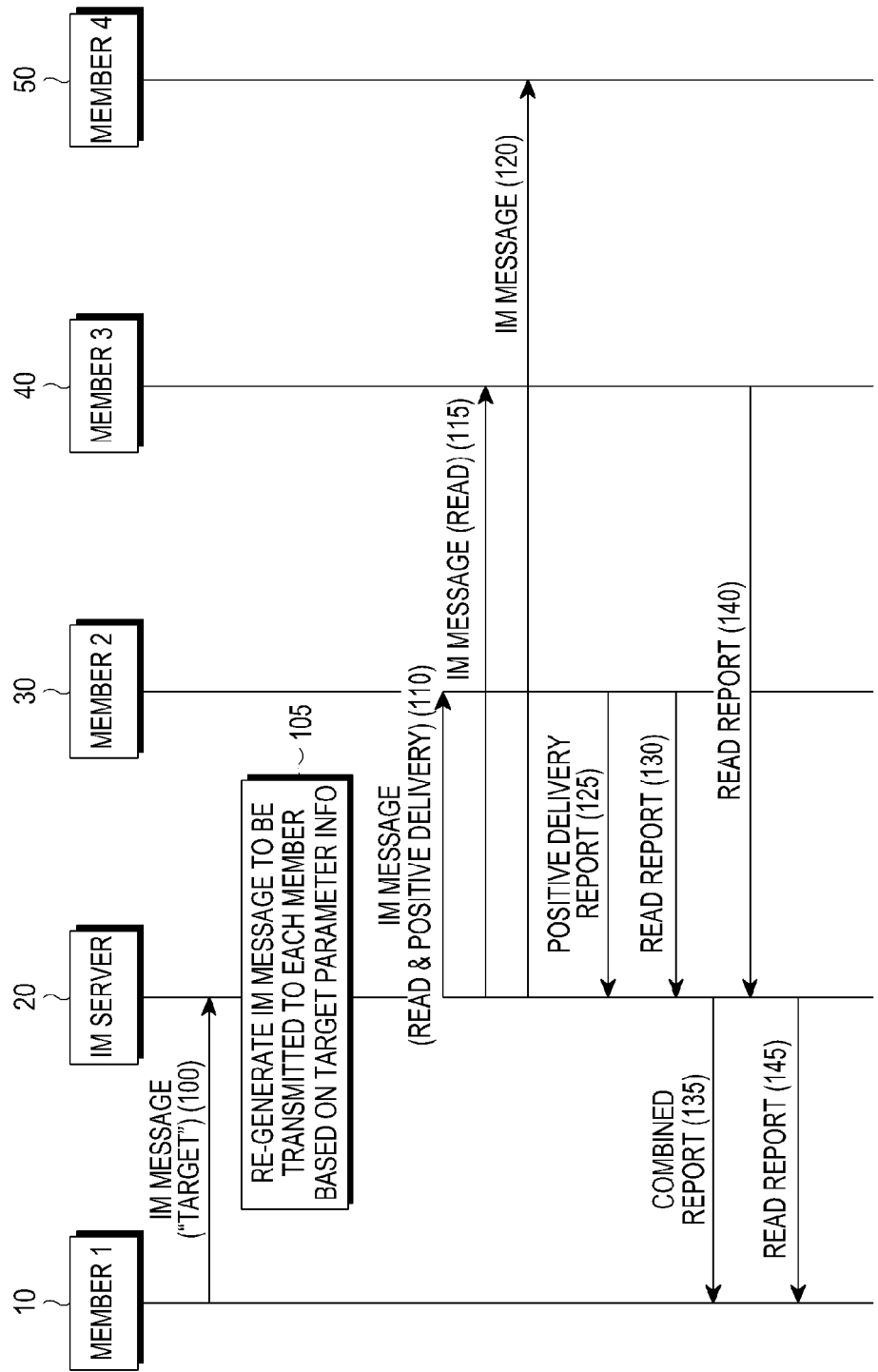
FIG. 2 is a signal flow diagram showing a process for transmitting and receiving messages between a sender and each target recipient according to an embodiment of the present invention.

Hereinafter, embodiments of the present invention will be described in detail with reference to the accompanying drawings. It should be noted that the same or equivalent elements are denoted by the same reference numerals throughout the accompanying drawings. Also, detailed descriptions of well-known functions and structures incorporated herein that may unnecessarily obscure the subject matter of the present invention are omitted for clarity.

The present invention provides a method, by which a sender can request desired group members for a disposition notification for an Instant Messaging (IM) message in a group messaging service. To this end, according to the present invention, the sender on the transmission side constructs an IM message to include information on the group members designated by the sender, and then transmits the constructed IM message to an IM server. After receiving the IM message from the sender, the IM server generates IM messages corresponding to the group members based on the information included in the received IM message, and then transmits the generated IM messages to the group members, respectively. Accordingly, only the group members that have received the IM messages can generate their own reports, and then transmit the generated reports to the sender. By doing this, the sender can receive the disposition notification only from the desired group members.

As indicated above, the Burger reference document provides a mechanism by which a sender can request IMDN, and newly defines several Common Profile for Instant Messaging (CPIM) headers. One of the newly-defined CPIM headers is a Disposition-Notification header field. The Disposition-Notification header field is used to inform recipients of what report types the sender requests.

In the present invention, the sender uses the Disposition-Notification header field to designate target recipients among group members and, to this end, a new parameter is defined in the Disposition-Notification header field. The use of the Disposition-Notification header field and the newly-defined parameter therein for designating target recipients will be specifically described with reference to FIG. 1.

FIG. 1 illustrates a syntax in the Disposition-Notification header field according to an embodiment of the present invention. According to the syntax illustrated in FIG. 1, the Disposition-Notification header field may have field values corresponding to an optional number of parameters requested among negative-delivery, positive-delivery, processing, and read. When the Disposition-Notification header field has at least two field values, the at least two field values are separated by commas. A 'generic-param' may be located right after each of the at least two field values separated by the commas, and is separated from each of the at least two field values by a semicolon. According to the preset invention, a new parameter 200, which is used to indicate target recipients according to IMDN request from the sender, is defined by the 'generic-param.'

As illustrated in FIG. 1, the newly-defined parameter 200 'target' may have at least one Uniform Resource Identifier (URI) parameter. When the target parameter has at least two URI values, the at least two URI values must be separated by delimiters. In the present invention, commas may be used as delimiters. However, when the use of commas as delimiters is determined to be inappropriate, the commas may be replaced by another more appropriate delimiter.

By using the target parameter defined as a new parameter as described above, when transmitting an IM message including an IMDN request to group members, any sender who is participating in group messaging, can select group members at the sender's disposal as well as all group members, and can request only the group members selected by the sender for IMDN.

Hereinafter, an operation between elements of a mobile communication system based on the group messaging service will be described with reference to FIG. 2. FIG. 2 is a signal flow diagram showing a process for transmitting and receiving messages between the sender and each target recipient according to an embodiment of the present invention. In FIG. 2, a first member 10 is a transmission client, and second, third and fourth members 30, 40 and 50 are target clients designated by the transmission client. In order to help understanding of the present invention, the first through fourth members 10, 30, 40 and 50 are also referred to as Alice, Ann, Bob and Tom, respectively. For convenience of the following description, a transmission client terminal is called sender and target client terminals are called target recipients.

The transmission client terminal includes a message generator for generating an IM message including both information designating at least two target client terminals, from which the transmission client terminal intends to receive reports to the IM message among the multiple target client terminals, and report types, which the transmission client terminal intends to request according to the designated target client terminals. The client terminal also includes a transmitter/receiver for transmitting the generated IM message to an IM server 20, and receiving reports corresponding to the report types, which the transmission client terminal has requested according to the target client terminals, from the designated target client terminals through the IM server.

The IM server also includes a controller for determining whether the IM message received from the transmission client terminal includes the information designating the at least two target client terminals, from which the transmission client terminal receives reports to the IM message among the multiple target client terminals, identifies report types, which the transmission client terminal intends to request according to the designated target client terminals, and re-generates IM messages according to the designated target clients from the received IM message. The IM server further includes a transmitter/receiver for receiving the IM message from the transmission client terminal, transmitting the re-generated IM messages to the designated target client terminals, receiving the reports corresponding to the report types, which the transmission client terminal has requested according to the target client terminals, from the at least two designated target client terminals in response to the transmission of the re-generated IM messages, and transmitting the received reports to the transmission client terminal.

First, when determining whether notifications of IM messages have been received, results of IM message disposition, etc., the transmission client terminal corresponding to the first member 10 constructs an IM message to include an IMDN request, as known by those of skill in the art. Particularly, according to an embodiment of the present invention, the transmission client terminal constructs an IM message including information on target recipients in order to designate desired group members. To this end, "target" parameters newly defined in the Disposition-Notification header field is used as illustrated in FIG. 1.

When the IM message designating the target recipients has been generated as described above, in step 100, the transmission client terminal transmits the generated IM message to the IM server 20. At this time, the IM message transmitted to the IM server 20 includes target parameter information designating the target recipients according to the requested report types. Therefore, the IM server 20 identifies each target recipient to which the sender intends to send reports by analyzing the target parameters included in the IM message.

In this regard, examples of constructing IM messages transmitted to the IM server 20 are shown in FIGS. 3 and 4. FIG. 3 illustrates the case of directly expressing target recipients according to an embodiment of the present invention. FIG. 4 illustrates the case of indirectly expressing target recipients according to an embodiment of the present invention.

FIG. 3 illustrates a body of the IM message generated by using the target parameters when the sender requests a read report and a positive delivery report to a text message such as "Hello world" while transmitting the text message. For example, when the sender requests the third member (Bob) 40 for only a read report, requests the second member (Ann) 30 for a read report and a positive delivery report, and requests the fourth member (Tom) 50 for no reports, information on the target recipients may be expressed as illustrated in FIG. 3. For reference, the body part of the IM message including the IMDN request is expressed as contents in the CPIM format.

In FIG. 3, a Disposition-Notification header field 300 has 'read' and 'positive-delivery' as field values, and has a target parameter related to each field value. A target parameter related to 'read' has Bob's address, i.e. the email address of the third member 40, as a parameter value. A target parameter related to 'positive-delivery' has Bob's address and Ann's address as parameter values. On the other hand, since no reports have been requested for Tom, Tom's address corresponds to no target parameter value. As illustrated in FIG. 3, the target parameters of the Disposition-Notification header field can directly represent URIs which are the addresses of the target recipients according to the relevant report request.

Meanwhile, different from FIG. 3, the target parameters may indirectly represent the URIs which are the addresses of the target recipients as illustrated in FIG. 4. In this case, a URI-List and IDs indicating the URI-List are used.

Specifically, the URIs of the target recipients according to the IMDN request are entered in the URI-List (i.e. an XML document), and the URI-List including the URIs of the target recipients is inserted into a body part of the IM message. In this case, the target parameters have IDs as values which indicate the inserted URI-List. FIG. 4 provides an example of expressing the target recipients according to the IMDN request by using the URI-List and the IDs on the URI-List. In FIG. 4, the URI-List representing Ann's URI and Bob's URI is inserted into a body part 410 of a CPIM domain in the IM message. Also, a target parameter, which is subordinate to 'read' corresponding to a field value of a Disposition-Notification header field 400, has a pointer 405 as a parameter value which indicates the URI-List. The pointer 405 to this URI-List is assigned to the target parameter, and indicates a content-ID 415 of the body part 410 in the CPIM domain.

As described above, FIGS. 3 and 4 illustrate two syntaxes for requesting Ann and Bob for their read reports. In FIG. 4, a target parameter, which is subordinate to 'positive-delivery' corresponding to a field value of the Disposition-Notification header field 400, can also indirectly represent target recipients according to the request for positive delivery reports, such as when the field value is 'read'. However, when the number of the target recipients is singular, a URI-List of a person who is to be indirectly expressed must be inserted into the body part of the CPIM domain in the IM message, so that the entire size of the IM message unnecessarily increases. Therefore, in this case, it is more efficient to directly express the target recipients, as illustrated in FIG. 3.

The IM message constructed as illustrated in FIG. 3 or in FIG. 4 is transmitted to the IM server 20 (See FIG. 2). When receiving the IM message, the IM server 20 first determines whether the IM message includes target parameter information. When the determination result shows that the IM message includes target parameter information, in step 105, the IM server 20 re-generates IM messages to be transmitted to members based on the target parameter information.

Specifically, in step 110, the IM server 20 generates an IM message, which requests Ann, the second member 30 for a read report and a positive delivery report, based on the target recipient information shown in FIG. 3 or in FIG. 4, and transmits the generated IM message to Ann. In step 115, the IM server 20 generates an IM message, which requests Bob, the third member 40 for a read report, and transmits the generated IM message to Bob. In step 120, the IM server 20 generates an IM message, which requests Tom, the fourth member 50 for no reports, and transmits the generated IM message to Tom. At this time, it goes without saying that all the re-generated IM messages must include the text "Hello world" corresponding to user data which Alice, the first member 10, intends to transmit (See FIG. 3). Also, on the assumption that all group members are in the same service provider area, a separate IM server is not required for each target recipient as illustrated in FIG. 2, and the IM server 20 on the transmission side directly transmits the re-generated IM messages to the target recipients. Otherwise, in order to transmit the re-generated IM messages to the second, third and fourth members 30, 40 and 50, after transmitting the re-generated IM messages to an IM server on the reception side, the IM server 20 transmits the re-generated IM messages to the second, third and fourth members 30, 40 and 50 through the IM server on the reception side, respectively.

Meanwhile, the above operation process equally applies when the Disposition-Notification header field has multiple field values and has target parameters related to some of the multiple field values. For example, when a Disposition-Notification header field has 'positive-delivery' and 'read' as field values, with a target parameter related to 'read', but without a target parameter related to 'positive-delivery', each of the target recipients designated by the target parameter is only requested for a read report. On the other hand, when each of the recipients (i.e. all group members) of the IM messages is requested for a positive delivery report, a field value is included in the Disposition-Notification header field, to which a target parameter is not related.

Meanwhile, when receiving the IM message including the report request, by accepting the report request, each target recipient generates a requested report, and then transmits the generated report back to the sender. At this time, even after a target recipient rejects the report request from the sender, the target recipient generates a relevant report, and transmits the generated report back to the sender. However, in this case, the report from the recipient includes contents such that the target recipient has rejected the report requested by the sender instead of the requested message state information or the requested message disposition information. In step 110 of FIG. 2, Ann, the second member 30, has been requested for the read report and the positive delivery report. Therefore, in step 125, Ann transmits the positive delivery report to the IM server 20, and in step 130, transmits the read report to the IM server 20. Then, the IM server 20, as in step 135, combines the received read and positive delivery reports into a single report, and transmits the single report to the sender, the first member 10. In step 115, Bob, the third member 40, has been requested for a read report. Therefore, in step 140, Bob transmits the read report to the IM server 20. Then, the IM server 20, in step 145, transmits the read report to the sender, first member 10. As described above, when receiving a report from each target recipient, the IM server 20 on the transmission side transmits the received report to the sender. At this time, the IM server 20 may transmit the received report to the sender immediately when receiving the report. Otherwise, after waiting for a predetermined time period, the IM server 20 may combine the reports, which have been received within the predetermined time period, into a single report, and then transmit the single report to the sender.

Hereinafter, the operation of the IM server 20 on the transmission side will be described in detail with reference to FIG. 5, which is a flowchart showing the operation of the IM server on the transmission side according to an embodiment of the present invention.

Figure 5:
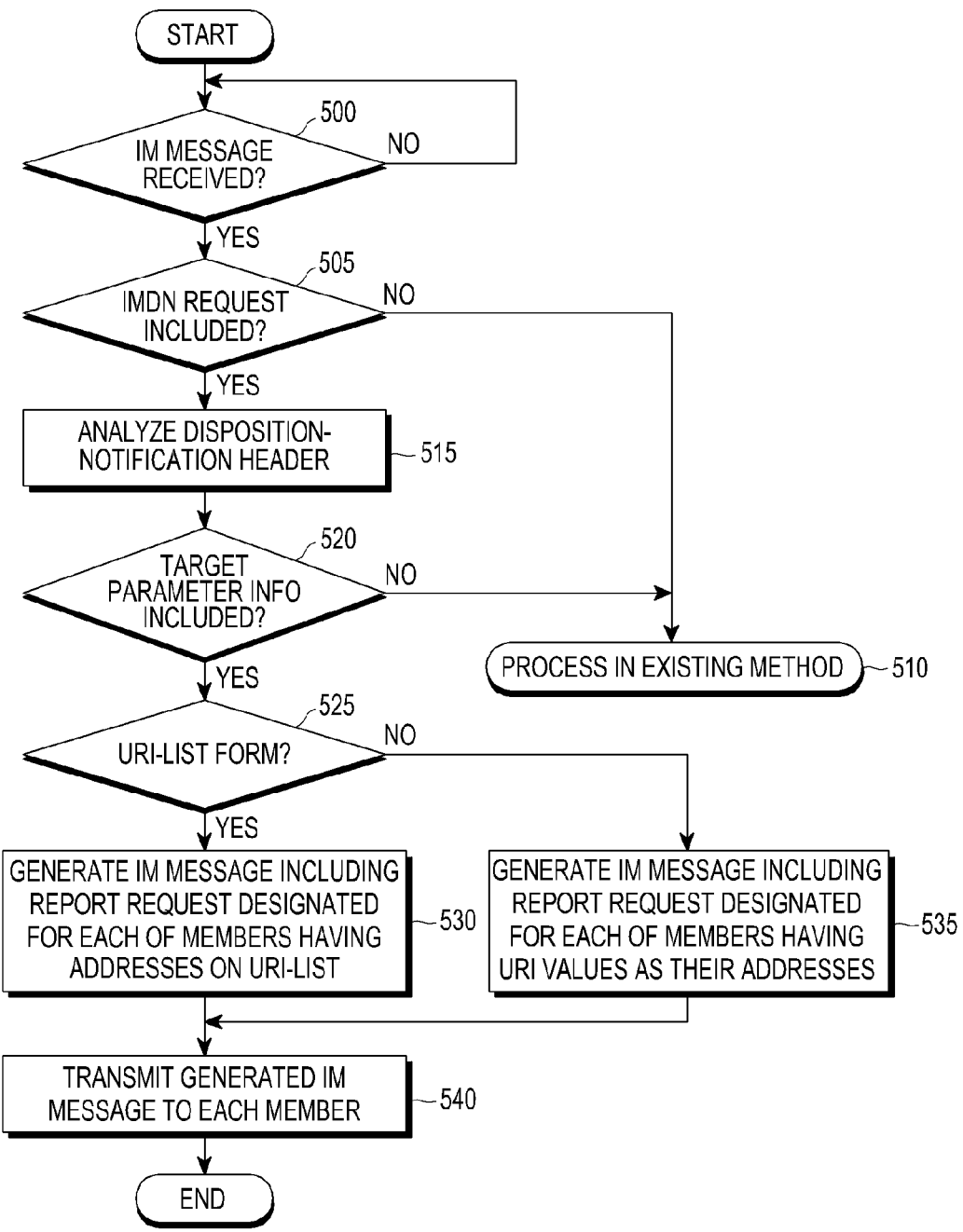
FIG. 5 is a flowchart showing the operation of an IM server on a transmission side according to an embodiment of the present invention.

Referring to FIG. 5, in step 500, the IM server 20 determines whether an IM message has been received. When the determination result shows that the IM message has been received, the IM server 20 determines in step 505 whether the IM message includes an IMDN request. Specifically, the IM server 20 determines whether the IM message includes a request for a disposition notification from each target recipient for the IM message. Whether the IM message includes the request can be determined by whether the IM message includes a Disposition-Notification header field. Therefore, the IM message including the IMDN request implies that the IM message includes the Disposition-Notification header field.

When the IM message does not include the IMDN request, the IM server 20, in step 510, processes the IM message. Namely, the IM server 20 copies the IM message a number of times that is equal to the number of all group members, and transmits the copied IM message to each group member. To this end, the IM server 20 can change the content of a recipient address field of each copied IM message to an IM address of each group member.

On the other hand, when the IM message includes the IMDN request, the IM server 20, in step 515, analyzes a Disposition-Notification header. Namely, the IM server 20 analyzes a Disposition-Notification header field. In step 520, the IM server 20 determines whether the Disposition-Notification header field includes target parameter information. When the determination result shows that the Disposition-Notification header field does not include the target parameter information, the IM server 20 proceeds to step 510. In step 510, the IM server 20 processes the IM message, which does not include the target parameter information, as described above.

On the other hand, when the determination result shows that the Disposition-Notification header field includes the target parameter information, the IM server 20 proceeds to step 525. In step 525, the IM server 20 determines whether values of target parameters are in a URL-List form. Specifically, the IM server 20 determines whether the values of the target parameters represent URI values corresponding to the IM addresses of the target recipients or indicate a URI-List included in a body part of the IM message.

When the values of the target parameters indicate the URI-List included in the body part of the IM message, the IM server 20, in step 530, generates an IM message including a report request designated for each member having an address on the URI-List. Therefore, the IM sever 20 includes, in an IM message to be transmitted to each of the IM addresses represented in the URI-List, a report request indicated by a field value of a Disposition-Notification header field related to a target parameter for each target recipient.

On the other hand, when the values of the target parameters are not in the URI-List form (i.e. when the values of the target parameters are the URI values of the target recipients), the IM server 20, in step 535, generates an IM message including a report request designated for each member having a URI value as their address. Therefore, the IM server 20 includes, in an IM message to be transmitted to each target recipient having a relevant URI value, a report request indicated by a field value of the Disposition-Notification header field related to a target parameter for each target recipient.

After generating the IM messages according to the target recipients through the process as described above, the IM server 20, in step 540, transmits the generated IM messages to group members corresponding to the respective target recipients. At this time, if the target recipients and the sender exist in the same network area, the IM server 20 on the transmission side directly transmits the IM messages to the target recipients. Otherwise, the IM server 20 on the transmission side transmits IM messages to target recipients through an IM server on the reception side which provides group messaging services to group members. According to the present invention as described above, after designating desired group members among group members, a sender receives a disposition notification only from the designated group members. Therefore, it is possible to promote the quality improvement of an IM service. While the invention has been shown and described with reference to certain embodiments thereof, it will be understood by those skilled in the art that various embodiments or modified embodiments of the present invention may be made therein without departing from the spirit and scope of the invention. Therefore, the spirit and scope of the present invention must be defined not by the described embodiments thereof but by the appended claims and equivalents of the appended claims.

The invention claimed is:

1. A method for requesting a disposition notification from a group member for an Instant Messaging (IM) message by a transmission client in a mobile communication system including the transmission client, an IM server and a plurality of target clients, the method comprising:

generating an IM message, for delivery to the plurality of target clients, that includes information on at least two target clients designated by the transmission client among the plurality of target clients, which are requested to report reception of the IM message, information designating a first of a plurality of report types for each of the at least two target clients, and information designating a second of the plurality of report types for at least one of the at least two target clients, the second report type being different than the first report type, wherein the at least two target clients is fewer than the plurality of target clients, the plurality of target clients is at least three target clients, and the plurality of report types comprises a read report indicating whether the IM message has been checked, a delivery report indicating whether the IM message has been transmitted to each of the at least two target clients, and a processing report indicating whether the IM message has been processed by the IM server;

transmitting the generated IM message to the IM server for delivery to the plurality of target clients; and receiving at least one report, corresponding to the at least one report type, from each of the at least two target clients through the IM server.

2. The method as claimed in claim 1, further comprising re-generating an IM message from the received IM message for each of the plurality of target clients by the IM server and transmitting the re-generated IM message to each of the plurality of target clients.

3. The method as claimed in claim 1, wherein the information designating the at least two target clients is inserted into a disposition-notification header field in the IM message.

4. The method as claimed in claim 1, wherein the information designating the at least two target clients is represented as a URI value of each of the at least two target clients by a target parameter defined in a disposition-notification header field of the IM message.

5. A method for providing a disposition notification from a group member for an Instant Messaging (IM) message by an IM server in a mobile communication system including a transmission client, the IM server and a plurality of target clients, the method comprising:

receiving an IM message from the transmission client for delivery to the plurality of target clients;

determining whether the received IM message includes information on at least two target clients designated by the transmission client among the plurality of target clients, which are requested to report reception of the IM message, information designating a first of a plurality of report types for each of the at least two target clients, and information designating a second of the plurality of report types for at least one of the at least two target clients, the second report type being different than the first report type, wherein the at least two target clients is fewer than the plurality of target clients, the plurality of target clients is at least three target clients, and the plurality of report types comprises a read report indicating whether the IM message has been checked, a delivery report indicating whether the IM message has been transmitted to each of the at least two target clients, and a processing report indicating whether the IM message has been processed by the IM server;

re-generating an IM message from the received IM message for each of the plurality of target clients, and transmitting the re-generated IM message to the plurality of target clients;

receiving at least one report, corresponding to the at least one report type, from each of the at least two target clients; and transmitting the received reports to the transmission client.

6. The method as claimed in claim 5, wherein the information designating the at least two target clients is inserted into a disposition-notification header field in the IM message.

7. The method as claimed in claim 5, wherein the information designating the at least two target clients is represented as a URI value of each of the at least two target clients by a target parameter defined in a disposition-notification header field of the IM message.

8. The method as claimed in claim 5, wherein the received reports are transmitted to the transmission client, whenever the at least one report, corresponding to the at least one report type, is received from one of the at least two target clients through the IM server.

9. The method as claimed in claim 5, wherein the received reports are transmitted as a single report to the transmission client, after receiving the at least one report, corresponding to the at least one report type, from each of the at least two target clients through the IM server, and after a predetermined time period combining the received reports into the single report.

10. A transmission client for requesting a disposition notification from a group member for an Instant Messaging (IM) message in a mobile communication system including the transmission client, an IM server and a plurality of target clients, the transmission client comprising:

a memory; and a processor coupled to the memory and configured to execute programmed instructions stored in the memory, the processor for generating an IM message, for delivery to the plurality of target clients, that includes information on at least two target clients designated by the transmission client among the plurality of target clients, which are requested to report reception of the IM message, information designating a first of a plurality of report types for each of the at least two target clients and information designating a second of the plurality of report types for at least one of the at least two target clients, the second report type being different than the first report type, wherein the at least two target clients is fewer than the plurality of target clients, the plurality of target clients is at least three target clients, and the plurality of report types comprises a read report indicating whether the IM message has been checked, a delivery report indicating whether the IM message has been transmitted to each of the at least two target clients, and a processing report indicating whether the IM message has been processed by the IM server; and a transmitter/receiver device for transmitting the generated IM message to the IM server for delivery to the plurality of target clients, and receiving at least one report, corresponding to the at least one report type, from each of the at least two target clients through the IM server.

11. An Instant Messaging (IM) server for providing a disposition notification from a group member for an IM message in a mobile communication system including a transmission client, the IM server and a plurality of target clients, the IM server comprising:

a memory; and a processor coupled to the memory and configured to execute programmed instructions stored in the memory, the processor for determining whether an IM message received from the transmission client includes information on at least two target clients designated by the transmission client among the plurality of target clients, which are requested to report reception of the IM message, information designating a first of a plurality of report types for each of the at least two target clients, and information designating a second of the plurality of report types for at least one of the at least two target clients, the second report type being different than the first report type, wherein the at least two target clients is fewer than the plurality of target clients, the plurality of target clients is at least three target clients, and the plurality of report types comprises a read report indicating whether the IM message has been checked, a delivery report indicating whether the IM message has been transmitted to each of the at least two target clients, and a processing report indicating whether the IM message has been processed by the IM server; and a transmitter/receiver device for receiving the IM message from the transmission client, transmitting the re-generated IM message to each of the plurality of target clients, receiving at least one report, corresponding to the at least one report type, from each of the at least two target clients in response to the transmission of the re-generated IM message, and transmitting the received reports to the transmission client.

* * * * *